Dec. 21, 1948.  E. A. HERRING  2,456,705
SINGLE HOOK WEEDLESS FISHING PLUG
Filed March 30, 1945
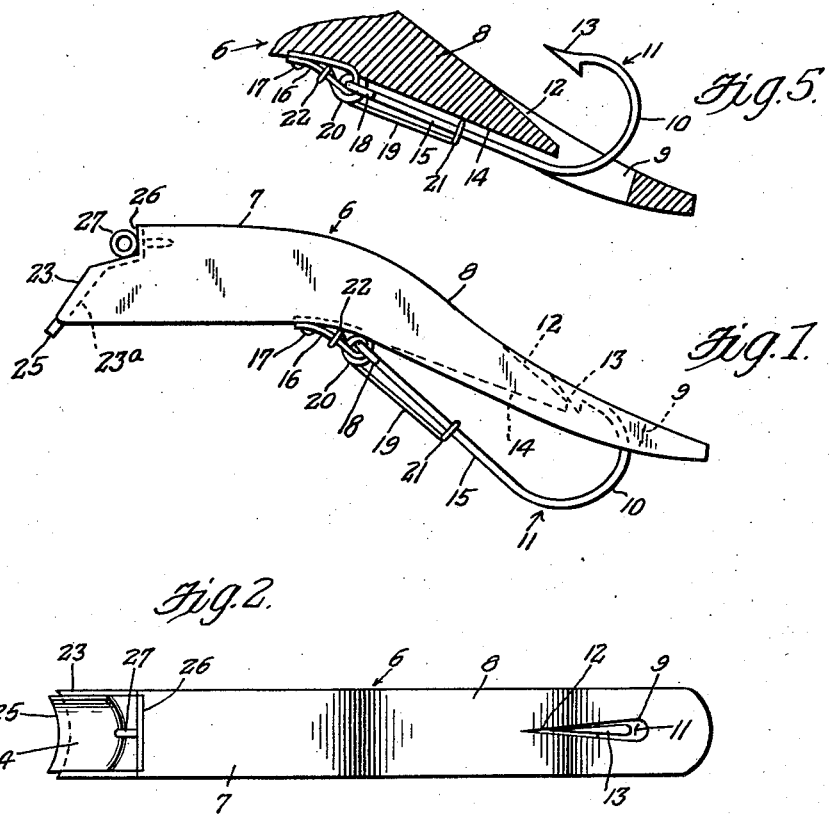
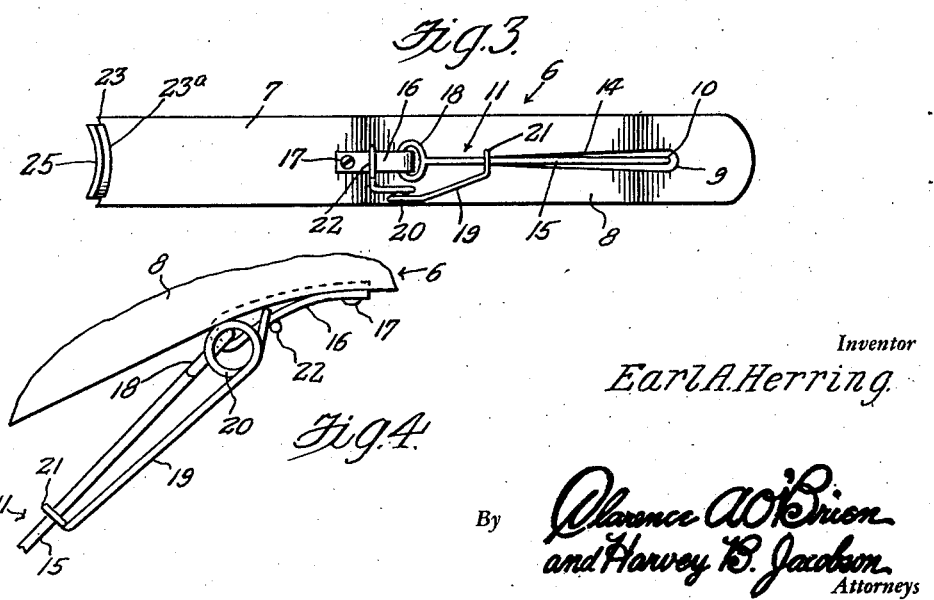
Inventor
Earl A. Herring
By Clarence A. O'Brien
and Harvey B. Jacobson
Attorneys Patented Dec. 21, 1948

2,456,705

UNITED STATES PATENT OFFICE 2,456,705

SINGLE HOOK WEEDLESS FISHING PLUG

Earl A. Herring, Donaldson, Pa., assignor of fifty per cent to Alice Dinger Herring, Donaldson, Pa.

Application March 30, 1945, Serial No. 585,633

1 Claim. (Cl. 43—39)

This invention relates to that class of fishermen's accessories characterized as artificial baits, lures, buoyant plugs, and the like, and the principal purpose is to generally, specifically, and otherwise improve upon known types of so-called weedless fishing plugs.

With a view toward attaining best results possible, I utilize a buoyant wooden, plastic or equivalent plug, this comprising a one-piece body whose frontal end is of shouldered or stepped form, this to accommodate a line eye, and said eye serving to hold in place a metal clip whose lower end protrudes below the normal bottom or lower side of the body.

Secondly, I have in mind a plug of the aforementioned style whose body portion is tapered rearwardly, said portion being substantially rectangular in cross-sectional form, and merging into a sloping and somewhat flattened tail portion.

The principal novelty, however, is predicated upon a plug whose rear portion is provided with a slot, this to accommodate the bend or bight portion of the fishing hook, there being a groove on the underside of the body communicating with said slot, and there being, on the top, a seating kerf, this for the barbed bill to rest in, whereby to permit it to recede to a position which permits the plug to be maneuvered freely through weed- and debris-laden water.

Another object of the invention has to do with the pivotal mounting of the shank portion of the hook, and the special attaching and spring means associated therewith.

Other features and advantages will become more readily apparent from the following description and the accompanying illustrative drawings.

In the drawings; wherein like numerals are employed to designate like parts throughout the same:

Figure 1 is a side elevational view of a single hook weedless fishing plug constructed in accordance with the principles of this invention, the hook, or rather the bill thereof, being shown in its normal guarded position.

Figure 2 is a top plan view of the structure seen in Figure 1.

Figure 3 is a bottom plan view of the same.

Figure 4 is a fragmentary view showing the hook anchoring or attaching means on a larger scale.

Figure 5 is a fragmentary detail section, longitudinally taken, of the tail structure.

Referring now to the drawing by distinguishing reference numerals, it will be seen that the plug proper is denoted by the numeral 6. It is of wood, plastic or equivalent buoyant material. The frontal end portion 7 is slightly tapered, that is, tapered rearwardly, and is substantially rectangular cross-sectional in form. The rear end portion 8 is directed laterally in respect to the longitudinal axis of the body portion and is tapered and flattened to form a so-called tail. As stated, the tail is provided with a slot 9 through which the bend or bight 10 of the projectible and retractable hook 11 has free movable play. The top of the tail portion is provided with a V-shaped kerf 12 sufficiently deep to accommodate the barbed bill 13 of the hook. Normally, the bill fits in the recess defined by said kerf. There is a similar tapering longitudinal groove 14 in the bottom of the tail portion which communicates at its rear end with a slot and which is gradually shallower toward the median portion of the plug. This serves to permit the shank 15 to seat properly therein, as shown, for example, in Figure 3.

As brought out in Figure 4, a strap of metal or the like 16 is bent upon itself to form a sort of loop, and this is fastened in place, as at 17, and provides an anchoring clip for the eye 18 on the inner end of the shank. This arrangement provides the desired hinge connection between the anchoring loop or clevis 16 and the fish-hook.

I also provide a spring 19 having a coil 20 intermediate its ends. One end of the spring is fashioned into a lateral eye 21 which slidably surrounds the shank of the hook. The opposite end is fashioned into a similar eye 21 which embraces and is fastened on the anchoring loop 16. The spring as a unit is slidable in respect to both the loop and hook, and to that extent the tension on the shank of the hook can be slightly regulated.

It is to be noted that the spring exerts a tension on the hook to swing the same in the direction indicated in Figure 1, that is, the hook is bodily swung to a position beneath the tail so that the barbed bill 13 rests normally in the kerf 12 where it is guarded. When a strike is made, the bill is projected, as is obvious, thus securely snaring the fish.

At the head or front end of the body, I provide a shoulder, beyond which projects a forwardly and downwardly tapered extension 23. The extension is fashioned with a groove 23a to accommodate the transversely curved portion of the metal plate or clip 24. The lower end of the plate protrudes slightly, as indicated at 25. The upper end is L-shaped, as at 26, and is fastened against the adjacent shoulders by the screw shank of the line-attaching eye 27.

It is believed that the mode of use and aforementioned features and advantages are such that they will be clear to persons skilled in the art to which the invention relates.

Minor changes in the shape, size and arrangement of details coming within the field of invention claimed may be resorted to in actual practice, if desired.

Reference being had in particular to the so-called clip or plate 25, it is to be pointed out that one function thereof is the added weight it affords. By weighing the head of the plug, by the addition of this plate, it quickens the ability of the plug to take the desired floating position on the top of the water promptly after the casting step. In addition, this plate functions as a protector or shield and thus armors the fore end of the plug and prevents same from chipping. The protruding lower end of the plate in relation to the bottom of the plug provides a rudder-like action and facilitates the retrieving step. Further, this protruding end serves as a sort of pendant and this feature, it has been found, attracts the prey.

I claim:

A single hook weedless fishing plug comprising an elongated buoyant body forming a float, said body having a rearwardly tapered and downwardly slanting tail portion, said tail portion having a slot and said slot being inwardly of the rear end of said tail portion, said tail portion having a kerf in its top side communicating with said slot, and being further provided with a longitudinal groove in its bottom also in communication with said slot, a conventional fishing hook having its bight portion operating in said slot and having its bill portion arranged for coaction with said kerf, an anchoring loop on the bottom of said body, said hook including a shank operable in said groove and provided with an eye, said eye being pivotally mounted in said loop, and a spring, one end of said spring being attached to said loop and the opposite end of said spring being formed with a lateral eye which embraces and is slidably mounted on the shank of said hook.

EARL A. HERRING.

REFERENCES CITED

The following references are of record in the file of this patent:

UNITED STATES PATENTS

| Number | Name | Date |
|---|---|---|
| 1,155,923 | Henzel | Oct. 5, 1915 |
| 1,537,266 | Ryan | May 12, 1925 |
| 1,615,803 | Pflueger | Jan. 25, 1927 |
| 1,645,644 | Davenport | Oct. 18, 1927 |
| 1,653,400 | Jeffries | Dec. 20, 1927 |
| 2,133,032 | Martz | Oct. 11, 1938 |
| 2,215,908 | Lauby | Sept. 24, 1940 |
| 2,259,635 | Hargrett | Oct. 21, 1941 |
| 2,290,702 | Nelson | July 21, 1942 |
| 2,315,247 | Davenport | Mar. 30, 1943 |